United States Patent
Falk et al.

(10) Patent No.: US 6,808,664 B2
(45) Date of Patent: Oct. 26, 2004

(54) METHOD OF FORMING AN AIR LAID FIBROUS WEB

(75) Inventors: Magnus Falk, Krokstrandswägen (SE); Anna Månsson, Pinnharvsgatan (SE)

(73) Assignee: SCA Hygiene Products AB, Gothenburg (SE)

( * ) Notice: Subject to any disclaimer, the term of this patent is extended or adjusted under 35 U.S.C. 154(b) by 312 days.

(21) Appl. No.: 09/861,530

(22) Filed: May 22, 2001

(65) Prior Publication Data

US 2001/0042949 A1 Nov. 22, 2001

(30) Foreign Application Priority Data

May 22, 2000 (SE) .............................................. 0001882

(51) Int. Cl.[7] .............................................. B27N 3/04
(52) U.S. Cl. ................... 264/121; 264/70; 264/444; 264/518; 425/83.1; 425/371
(58) Field of Search ................ 264/70, 444, 121, 264/518; 425/371, 83.1

(56) References Cited

U.S. PATENT DOCUMENTS

| | | | |
|---|---|---|---|
| 2,571,334 A | * | 10/1951 | Browne et al. ............. 264/518 |
| 4,047,865 A | | 9/1977 | Axer et al. ................... 425/80 |
| 4,158,594 A | | 6/1979 | Becker et al. ............... 162/112 |
| 4,761,258 A | * | 8/1988 | Enloe .......................... 264/518 |
| 5,873,963 A | | 2/1999 | Trombetta et al. ......... 156/62.1 |
| 6,080,344 A | * | 6/2000 | Thorbjornsson ............. 264/83 |
| 2002/0063363 A1 | * | 5/2002 | Smith ......................... 264/518 |

FOREIGN PATENT DOCUMENTS

| | | |
|---|---|---|
| EP | 0 528 284 A1 | 2/1993 |
| GB | 2 162 465 A | 2/1986 |
| WO | 98/28480 A1 | 7/1998 |

* cited by examiner

*Primary Examiner*—Mary Lynn Theisen
(74) *Attorney, Agent, or Firm*—Burns, Doane, Swecker & Mathis, L.L.P.

(57) ABSTRACT

Method for forming an air laid fibrous web, wherein an air born fiber stream is laid on a web shaped forming member, such as a wire, and the air laid fibrous web is bonded together. The air laid fibrous web is fed between two web-shaped forming members and bonding of the fibrous web takes place either when this is located between the two web-shaped forming members or immediately after one forming member has left the fibrous web.

12 Claims, 1 Drawing Sheet

METHOD OF FORMING AN AIR LAID FIBROUS WEB

TECHNICAL FIELD

The present invention refers to a method for forming an air laid fibrous web, wherein an air born fiber stream is laid on a web-shaped forming member, such as a wire, and the air laid fibrous web is bonded together.

BACKGROUND OF THE INVENTION

When air laying a fibrous web there are normally used one or more fiber distributors by means of which the air born fiber stream is distributed over a flat wire, which is under a vacuum, at which a fibrous web is formed. The fibrous web is compacted and bonded by means of moisture or a bonding agent, such as latex or bonding fibers. The bonding agent can either be contained as a component in the fiber stream or be added to the fibrous web after the air laying thereof.

Such dry or air formed materials obtains a high bulk, softness, smoothness and drapability as compared to a corresponding wet laid material and obtains almost textile like properties. Due to the bonding agent a high wet strength is also obtained. The drawback of the air laying process is that it is not possible to run in the high production speeds that are possible in a wet laying process. This involves a considerable higher production cost, which leads to that the method usually is limited to the production of relatively exclusive materials such as dinner napkins, table cloths, washing cloths and the like. The materials are also often used as pail of other hygiene products, like sanitary napkins and panty liners.

The production speed of such air laid fibrous webs is limited, mainly due to the fact that the unbonded web is very sensitive to all kind of mechanical influence which may lead to web breaks at free draughts and cause an uncontrolled rearrangement of the fibers and thus influence the fiber distribution in the web. Besides problems occur with dusting from the open fibrous web.

OBJECT AND MOST IMPORTANT FEATURES OF THE INVENTION

An object of the present invention is to provide a method for forming an air laid fibrous web of the kind mentioned above, and which permits production at considerably higher speeds than in conventional air laying technique on a flat wire and where the above mentioned problems are avoided. This has according to the invention been provided by feeding the air laid fibrous web between two web-shaped forming members and binding the fibrous web either when this is located between the two web-shaped forming members or immediately after one forming member has left the fibrous web.

According to one embodiment the fibrous web is exerted to a mechanical actuation when located between the forming members, in order to provide a more even fiber distribution. By this a very even fiber formation can be obtained by simple means.

According to a further embodiment at least one of the web-shaped forming members has a three-dimensional structure which is shaped into the fibrous web. Preferably a pressure is applied to the forming members in order to press the structure into the fibrous web.

According to one embodiment the air born fibrous stream is applied in a nip between two wires which are brought together immediately after the laying of the fibers. Preferably the wires are brought together over a curved forming element.

According to a further embodiment the air born stream is laid on a first substantially flat forming member, after which a second forming member is brought together with the first forming member with the air laid fibrous web therebetween.

According to a further embodiment the air born fibrous stream is fed between two forming members which are brought together gradually for admitting deaeration of the fibrous web over a relatively large area, at which the first part of the forming takes place over an open zone between forming members and the final part takes place over a closed zone where the forming members have been brought together. The mechanical agitation of the fibrous web takes place either as well in the open as in the closed zone or only in one of them.

The mechanical agitation of the fibrous web is done by a direct actuation thereof and/or by an indirect actuation via at least one of the web-shaped forming members.

Said agitation can be provided by means of vibrations, breaking over one or more rolls, air pulses, alternating vacuum and over pressure and/or by ultrasonic, infra sonic etc.

According to a preferred embodiment bonding of the fibrous web takes place when this is located between the wires.

DESCRIPTION OF DRAWINGS

The invention will in the following be closer described with reference to some embodiments shown in the accompanying drawings.

DESCRIPTION OF EMBODIMENTS

Figure 1:
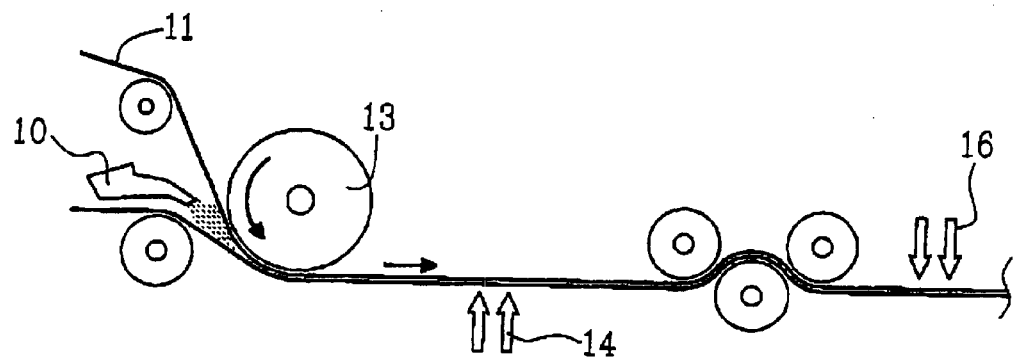
FIG. 1 is a schematic illustration of an air laying process according to a first embodiment.

In FIG. 1 there is schematically shown a process for forming a fibrous web according to the twin wire principle, at which a fibre stream is blown into the nip between two wires 11 and 12, which are brought together over a forming roll 13. The twin wire principle is commonly used within paper production according to the wet laying technique. The fibers are fed into the nip by means of a headbox 10 adapted for this purpose.

Instead of wires 11 and 12 there may be used other kinds of web-shaped forming means, such as felts, membranes, bands or the like. However at least one of the forming members 11,12 has to be air permeable.

The fibers used in an air laying process may be of varying kind, such as cellulosic fibers and natural fibers of different kind, regenerated cellulose and synthetic fibers of different kind and mixtures of these different fiber types. Besides substances in powder or particulate form other than fibers may be contained, for example superabsorbent particles, filling agents, bonding agents and the like.

The forming roll 13 can have a solid or open surface, be under a vacuum or not. The fiber stream which is laid between the wires 11, 12 forms a fibrous web after deaeration and is kept between the wires during the continued transport through the process. The fibrous web is mechanically actuated during the transport by means of actuating means 14, at which a redistribution of the fibers as well as a breaking up or possible fiber flocks may occur. This can be done due to the fact that the fibrous web at this stage still is unbonded, and since it is kept between the two wires the fibers can not be redistributed in an uncontrolled way or even be blown off the wires, which would be the case in a conventional air laying process where the fibrous web is fed on top of a flat wire. Besides dusting is avoided. The agitation at this stage does not involve any negative influence on the strength properties of the final product, since the bonding of the fibrous web has not yet taken place.

The mechanical actuation of the fibrous web while held between the wires can be caused in different ways, for example by breaking the wires over one or more rolls 15, by air pulses, alternating over- and sub pressures, ultrasonic, infrasonic and/or other vibration generating means. According to an embodiment there can already in the forming zone 13 be blowing zones causing an agitation of the fibrous web.

By agitating the fibrous web the formation is improved and a more even basis weight of the final product is obtained. Possible irregularities which may occur during the fiber formation can by this be evened.

Bonding of the air laid fibrous web can be made in a conventional way. One example of a bonding method is that the air laid fibrous web contains a bonding agent which is activated by for example heat, plasma, or corona treatment or by UV-irradiation.

Examples of such bonding agents are thermoplastic fibers or particles, which soften by heat and by that bind the fibers together. The bonding agent may also be a reactive component that is anchored on the fiber surface and which is activated in any of the above mentioned ways. By using this type of bonding method the bonding of the fibrous web can be made while this is still between the wires 11, 12. The activation of the bonding agent takes place in a bonding station 16.

Bonding can also be made by moisture, at which the fibers already from the start can have a certain moisture content, for example at least 30%, or by adding moisture to the laid fibrous web. It is also possible to after laying of the fibrous web add a bonding agent, for example latex, by spraying, coating or the like, said bonding agent can then be activated by heat, irradiation or in some other way.

At least one of the web-shaped forming members 11, 12 can have a three dimensional structure which is shaped into the fibrous web and be permanented by the bonding. It is also in this case appropriate that bonding of the fibrous web is done while this is still between the forming members /wires, at which the pattern is pressed into the fiber web. It would also be possible to apply a pressure on the forming members/wires in order to reinforce the patterning effect.

As forming means there could also be used for example similar wires that are today used within the so called TAD-technique (through-air-drying) for paper production and for drying wires or forming wires. The material in the wires 11, 12 should be of a heat resistant, weal resistant material. Polyamide, polyester, PEEK (polyether ether ketone) and aramide can be suitable materials for the wires.

Figure 2:
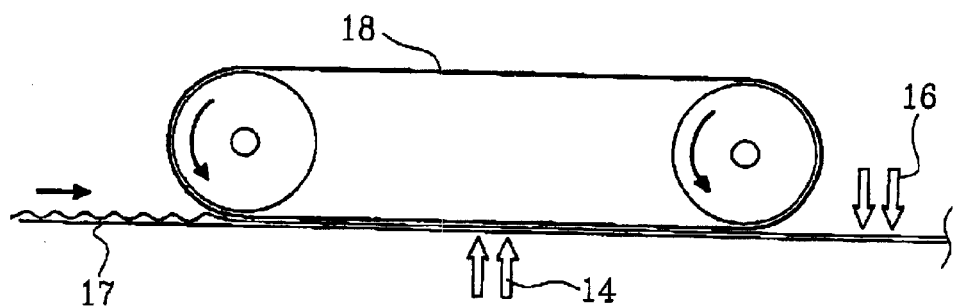
FIG. 2 is a schematic illustration of an air laying process according to a second embodiment.

According to that embodiment shown in FIG. 2 the fibrous web is laid on a flat wire 17 with conventional air laying technique by means of a forming head, after which the wire 17 is brought together with a second wire 18 so that the fibrous web is held between the wires 17, 18. A mechanical agitation 14 of the fibrous web is done in a corresponding way as disclosed above. Bonding of the fibrous web is then made in a bonding station 16 in any of the ways described above. In this case it is shown that bonding takes place after the second wire 18 has left the fibrous web and this is supported only by the flat wire 17. With the embodiment shown in FIG. 2 a conventional already existing air laying device can be easily rebuilt.

Figure 3:
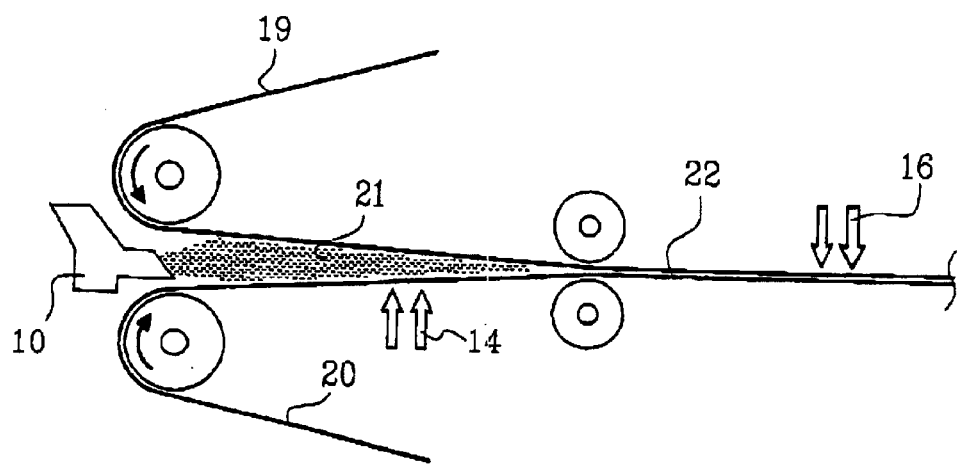
FIG. 3 is a schematic illustration of an air laying process according to a third embodiment.

According to the embodiment of FIG. 3 the air born fiber stream is fed between two wires 19, 20 which are gradually brought together, at which deaeration of the fibrous web can take place over a larger area. In the initial phase of the forming there is an open zone 21 between the wires and in the final part of the forming a closed zone 22 in which the wires 19 and 20 are brought together. Mechanical agitation 14 of the fibrous web can take place as well in the open zone 21 as in the closed zone 22 or in only any thereof. In the open zone the distance between the wires is determined by the relative positions of the rolls, which may be adjustable. In the closed zone the distance between the wires is primarily determined by the thickness of the fibrous web.

After bonding the fibrous web can be exerted to a conventional after treatment such as calendering, lamination, embossing or the lime before winding and further converting to the final product.

The invention offers an improved process for the production of air laid fibrous materials, which can be run at considerably higher speeds than a conventional air laying process and where it is possible by simple means to provide an even fiber distribution. At the same time all advantages concerning product properties of the air laid fibrous material are obtained. Besides the fibrous web can by simple means be given a three-dimensional structure.

What is claimed is:

1. A method for forming an air laid fibrous web, wherein an air born fiber stream is laid on a web shaped forming member such as a wire, and the air laid fibrous web is bonded together, wherein the method includes feeding the air laid fibrous web between two web-shaped forming members and binding the fibrous web either when the air laid fibrous web is located between the two web-shaped forming members or immediately after one forming member has left the fibrous web.

2. Method as claimed in claim 1, wherein the fibrous web is exerted to a mechanical actuation when located between the forming members, in order to provide a more even fiber distribution.

3. Method as claimed in claim 1, wherein at least one of the web-shaped forming members is an air permeable wire or felt.

4. Method as claimed in claim 1, wherein at least one of the web-shaped forming members has a three-dimensional structure which is shaped into the fibrous web.

5. Method as claimed in claim 4, wherein a pressure is applied to the forming members in order to pass a structure into the fibrous web.

6. Method as claimed in claim 1, wherein the air born fibrous stream is applied in a nip between two web-shaped forming members which are brought together immediately after the laying of the fibers.

7. Method as claimed in claim 6, wherein the web-formed forming members are brought together over a curved forming element.

8. Method as claimed in claim 1, wherein the air born stream is laid on a first substantially flat forming member, after which a second web-shaped forming member is brought together with the first forming member with the air laid fibrous web therebetween.

9. Method as claimed in claim 1, wherein the air born fibrous stream is fed between two forming members are brought together gradually for admitting deaeration of the fibrous web over a relatively large area, at which the first part of the forming takes place over an open zone between the forming members and the final part takes place over a closed zone where the forming members have been brought together.

10. Method as claimed in claim 9, wherein mechanical agitation of the fibrous web takes place either as well in the open as in the closed zone or only in one of them.

11. Method as claimed in claim 1, wherein mechanical agitation of the fibrous web is done by a direct actuation thereof and/or by an indirect actuation via at least one of the web-shaped forming members.

12. Method as claimed in claim 11, wherein said agitation is provided by means of vibrations, breaking over one or more rolls, air pulses, alternating vacuum and over pressure or by utrasonic or infra sonic.

* * * * *